Figure 1:
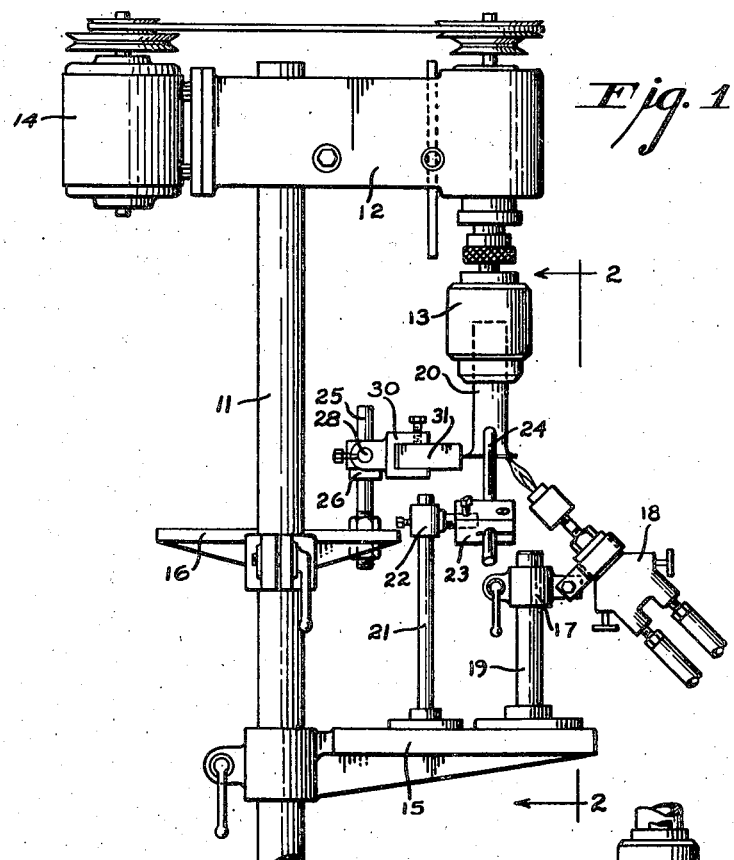

July 12, 1949.  P. L. ORR  2,475,915

REHEATING AND RESHAPING GLASS ARTICLES

Filed April 27, 1944.

Inventor
PERCY L. ORR
By
F. H. Knight
Attorney

Patented July 12, 1949

2,475,915

UNITED STATES PATENT OFFICE 2,475,915

REHEATING AND RESHAPING GLASS ARTICLES

Percy L. Orr, Corning N. Y., assignor to Corning Glass Works, Corning, N. Y., a corporation of New York Application April 27, 1944, Serial No. 533,005

15 Claims. (Cl. 49—84)

The present invention relates in general to the reheating and reshaping of glass articles and primarily to the flaring of tubing for the manufacture of lamp and radio tube stems. It is the universal practice of radio tube and lamp manufacturers to flare a tube by heating the end to be flared to plasticity and then flaring it out by use of a tool which is inserted in the hot end of the tube and rotated as required to tool out the plastic glass to the desired contour. This method has certain inherent disadvantages. There is always a strong tendency to produce flares which are both eccentric and out-of-round, especially so if the tubing is oval or varies in wall thickness, or if the end of the tube is rough or uneven, as the foregoing method lacks any means of control of the edge of the flare produced. Also, if the temperature of the glass or the flaring tool is not held within required limits the tool checks or abrades the glass, resulting in a loss of production and a hazard to anyone observing the operation.

The eccentricity of the flares has a very definite effect on the loss which may occur in stem making, final sealing, and basing. For minimum loss the diameter and roundness or eccentricity of the flare to the axis of the tube should accordingly be held within rather close tolerances. The edge of the flare should also be free from waves or scallops so as to fit flat against the end of an envelope, or the like, to which it is to be sealed. These characteristics are attainable by prior reshaping methods when the tubing employing is perfectly round, is cut squarely transverse the bore with no rough edges, and if the wall thickness is uniform. Unfortunately, however, the average run of tubing invariably has one or more of the above defects and, as above pointed out, by conventional flaring methods the finished flares reflect these variations. Then too, as previously stated, the success of the method depends on maintenance of rather critical tool and glass temperatures.

The prime object of the present invention is a better method of reshaping glass articles.

Another object is a method which produces flares of uniformly good quality from tubing which varies considerably in quality as regards roundness, eccentricity, etc.

According to my invention, the tube to be flared is mounted by one end in a suitable chuck and rotated while its free end is being heated to plasticity. As the glass becomes plastic it is flared solely by centrifugal force while restraining forces are applied to limit the effect of centrifugal force and the path of flow of the plastic glass in a manner to attain a round flare of predetermined diameter which is concentric to the axis of rotation and whose peripheral edge terminates in a plane transverse to the axis of the tube. By this method all danger of working the glass when too cold or by tools which may check the glass or abrade it are avoided, since the glass never contacts the tools until it has reached the proper flowable temperature and the force of contact is not too great, being created by centrifugal force rather than the positive movement of a tool.

To more specifically describe one method of practicing the invention, flaring operations carried out in accordance therewith will be described, reference being had from time to time to the accompanying drawing.

Figure 2:
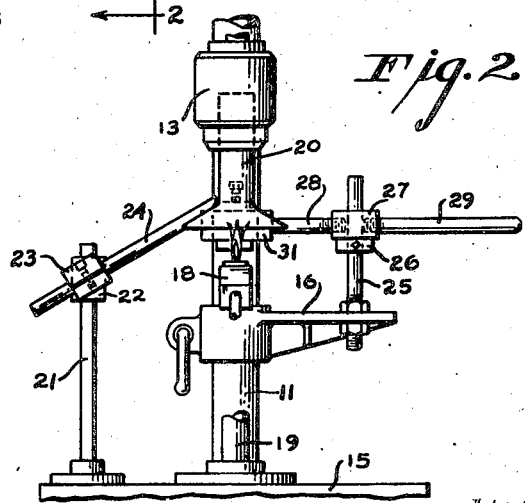
Figure 3:
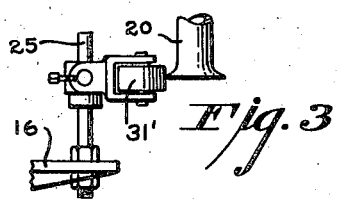
Figure 4:
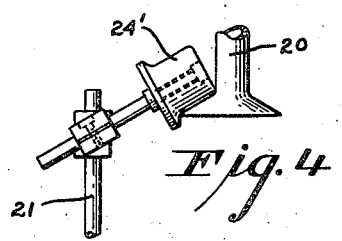

In the drawing,

Fig. 1 is a side elevation of an apparatus embodying the invention, and illustrating a tube in its initial flaring stage;

Fig. 2 is a view of a fragment of Fig. 1 as seen when looking in the direction indicated by arrows 2—2, during the final stage of the flaring operation; and Figs. 3 and 4 show fragments of the apparatus of Figs. 1 and 2 provided with modified forms of equipment.

More specifically the apparatus of Fig. 1 comprises a drill press assembly comprising the usual vertical standard 11, and a head 12 supporting a chuck 13 and driving motor 14. The usual adjustable work support 15 and an auxiliary adjustable support 16 are also provided.

Arranged on support 15 is a post 19 serving as a support for a clamp 17 carrying a burner 18 adjustable to readily enable one to direct a flame toward a tube 20 as conditions require. Adjustably held to a vertical post 21 on support 15 is a clamp 22 having a horizontal stub shaft supporting a clamp 23 provided with a flare shaping and diameter limiting member 24, which may be composed of hard carbon or other suitable material. Member 24 is shaped at its free end to the contour it is desired to impart to a finished flare and to limit the flare radius to a specific predetermined distance from the axis of chuck 13 irrespective of any variation in wall thickness or out-of-roundness of the original tube 20, and also irrespective of the fact that the end of the tube may have been unevenly cut off, as hereinafter described. As an alternative, the flare shaping member may take the form of a roller 24' (Fig. 4).

Arranged on auxiliary support 16 is a vertically disposed post 25 having thereon a collar 26 on which rests a bushing 27 into opposite sides of which are threaded a tool support 28 and a handle 29, respectively. The free end of support 28 carries a tool clamp 30 having held therein a glass engaging tool or block member 31, preferably composed of soft carbon, and employed to suitably restrict the centrifugal movement of plastic glass, as hereinafter described. As an alternative, in lieu of block member 31, a roller 31' (Fig. 3) may be used.

*Operation*

A flaring operation may be carried out as follows: a glass tube 20 is placed in chuck 13 and rotation of the chuck initiated; the burner 18 is then adjusted to direct its flame upward against the interior and exterior surfaces of the bottom end of the tube 20, and block member 31 is moved into close proximity to the tube. As the bottom end of the tube becomes plastic, it is gradually moved by centrifugal force into contact with member 31 which is drawn back to allow centrifugal development of the flare to an intermediate diameter at a rate slower than would occur in its absence, and held there temporarily. To explain further, the member 31 thus holds the flare to a limited diameter while the heating means further plasticizes the glass. Thus during the early stages of the flare development, the thicker sections of the tube, if there are any, are given time to reach the temperature of the thinner sections and to thus be centrifugally forced into contact with the member 31 which assures the formation of a flare whose boundary is circular and concentric to the axis of rotation. Also, the entire end surface of the tube, if uneven, is given time to become even by surface tension and with the assistance of centrifugal force while restricted to a limited diameter by member 31. When sufficient heating has taken place to impart uniform plasticity of all glass to compose the flare and its periphery is all forced into rubbing contact with member 31, the member is removed and the flare then expands until it comes into contact with the flare shaping and diameter limiting member 24 under the influence of centrifugal force. A flame may then be held directed toward the periphery of the flare for ample time to assure flowing of all portions of the flare including its entire perimeter into intimate and uniform contact with member 24. After the flare has been fully developed, the burner may be swung to one side, rotation of the flare discontinued and the finished flare removed from the chuck and suitably annealed. As will be appreciated, employment of either member 31' or 24' in lieu of the similarly functioning part 31 or 24 can be resorted to without materially changing the described operating procedure.

Use of member 31 or its equivalent is essential, however, as otherwise the flare will develop out-of-roundness and eccentricity at the early stages of development and it will be practically impossible to correct this condition during the final stage of development. Also, in the uncontrolled development of a flare there is a tendency for the flare thickness to gradually reduce as its distance from the axis increases, whereas this tendency is reduced when a restraining member such as 31 is employed.

Although only one burner assembly has been illustrated, it should be understood that for some types of flares, particularly large ones, two or more independently mounted adjustable burners may be employed to advantage.

The best speed of rotation of the tube depends upon its diameter and the diameter of flare to be produced, and also upon the intensity of the heating flame. In producing a two inch flare on a half inch tube, speeds of from 1500 to 1800 R. P. M. have been found quite satisfactory.

Although the invention has been illustrated as applied to the reheating and reshaping of tubular blanks into flares as commonly used in lamp and radio tube manufacture, it should be understood that the invention lends itself to the reshaping of many other forms of glass articles of revolution.

What is claimed is:

1. The method of forming a flare on the end of a glass tube, which includes subjecting the end of the tube to melting heat while rotating the tube about its axial center at a speed sufficient to centrifugally flare the end thereof as it becomes plastic against a restraining member and moving the member in a direction away from the axial center of the tube at a rate which retards the centrifugal development of the flare.

2. The method of forming a flare on the end of a glass tube, which includes subjecting the end of the tube to melting heat while rotating the tube about its axial center at a speed sufficient to centrifugally flare the end thereof as it becomes plastic, placing an implement in the path of flare development and moving the implement outward at a rate to retard the centrifugal development of the flare.

3. The method of forming a flare on the end of a glass tube, which includes subjecting the end of the tube to melting heat while rotating the tube about its axial center at a speed sufficient to centrifugally flare the end thereof as it becomes plastic, forcing uniform development of the flare during intermediate stages of growth by placement of an implement in its path and withdrawing it in the direction of flare development at a rate to retard the development by centrifugal action.

4. The method of forming a flare on the end of a glass tube, which includes subjecting the end of the tube to melting heat while rotating the tube about its axial center at a speed sufficient to centrifugally flare the end thereof as it becomes plastic, placing an obstruction in the expanding path of the flare and moving the obstruction in the direction of flare development at a speed which restricts the rate of centrifugal development.

5. The method of forming a flare on the end of a glass tube, which includes subjecting the end of the tube to melting heat while rotating the tube about its axial center at a speed sufficient to centrifugally flare the end thereof as it becomes plastic to the form of a backing member placed in the path of travel of the expanding flare, and applying a restraining force to the softened glass to limit the rate of centrifugal development of the flare prior to its encountering the backing member.

6. The method which includes rapidly rotating a thermoplastic article of revolution about its axial center, applying melting heat to a portion of the article to be reshaped so that as such portion becomes plastic it will flow under the influence of centrifugal force, and applying a restraining force to the softened portion to control the extent of expansion by centrifugal action as expansion proceeds and until the portion being reshaped has been expanded to final form.

7. The method which includes rapidly rotating a thermoplastic article of revolution about its axial center, applying melting heat to a portion of the article to be reshaped so that as such portion becomes plastic it will flow under the influence of centrifugal force, delaying centrifugal expansion of the heated portion beyond a predetermined distance from its axial center by application of a restraining force to the softened portion until the entire outline of such portion has been expanded said predetermined distance and thereafter freeing the heated portion for centrifugal expansion to final form.

8. The method which includes rapidly rotating a thermoplastic article of revolution about its axial center, applying melting heat to a portion of the article to be reshaped so that as such portion becomes plastic it will flow under the influence of centrifugal force, and holding a backing member against the softened portion to restrict its expansion to final form to a rate below that at which expansion would occur under the unrestricted influence of centrifugal force.

9. The method which includes rapidly rotating a thermoplastic article of revolution about its axial center, applying melting heat to a portion of the article to be reshaped so that as such portion becomes plastic it will flow under the influence of centrifugal force, temporarily placing a restriction in the path of expansion of the portion to restrict such portion to a diameter smaller than that ultimately desired while continuing the heating thereof and thereafter removing the restriction whereby rapid expansion to final form through the action of centrifugal force occurs.

10. The method of flaring the end of a glass tube, which includes rotating the tube about its axis, heating an end of the tube to plasticity while it is rotating at a speed sufficient to centrifugally flare it, temporarily restricting formation of the flare centrifugally to a predetermined diameter less than ultimately desired while continuing the application of heat to render the tube more plastic to insure centrifugal casting of the entire periphery to said predetermined diameter, thereafter removing the restriction whereby centrifugal force rapidly expands the flare, and restricting expansion to a predetermined distance from the axis of the tube.

11. The method of forming a flare on the end of a glass tube, which includes subjecting the end of the tube to melting heat while rotating the tube about its axial center at a speed sufficient to centrifugally flare the end thereof as it becomes plastic, and applying restrictive control over the rate of centrifugal flare development by subjecting the peripheral surface to a tooling treatment while moving the treating tool laterally away from the axis of the tube.

12. The method of forming a flare on the end of a glass tube, which includes subjecting the end of the tube to melting heat while rotating the tube about its axial center at a speed sufficient to centrifugally flare the end thereof as it becomes plastic, applying restrictive control over the rate of centrifugal flare development by subjecting the peripheral surface to a tooling treatment until the glass in the flare portion of the tube has attained temperature equilibrium, then moving the tool clear of the flare to rapidly expand it centrifugally into contact with a backing member.

13. The method of forming a flare on the end of a glass tube, which includes subjecting the end of the tube to melting heat while rotating the tube about its axial center at a speed sufficient to centrifugally flare the end thereof as it becomes plastic while maintaining auxiliary control over the rate of flare development by subjecting the peripheral surface to a tooling treatment in opposition to pressures developed by centrifugal action, moving the treating tool laterally away from the axis of the tube at a rate to limit the rate of centrifugal development, and maintaining the heating means directed into the end of the tube throughout the operation.

14. The method of forming a flare on the end of a glass tube, which includes subjecting the end of the tube to melting heat while rotating the tube about its axial center at a speed sufficient to centrifugally flare the end thereof as it becomes plastic while maintaining auxiliary control over the rate of flare development by subjecting the peripheral surface to a tooling treatment in opposition to pressures developed by centrifugal action until the glass in the flare portion of the tube has attained temperature equilibrium, then moving the tool clear of the flare to rapidly expand it centrifugally into contact with a backing member, and maintaining the heating means directed into the end of the tube throughout the operation.

15. The method of forming a flare on the end of a glass tube, which includes subjecting the end of the tube to melting heat while rotating the tube about its axial center at a speed to centrifugally flare the end thereof as it becomes plastic, and applying a restraining force to the developing flare to control its rate of centrifugal development until the flare has been expanded substantially to its final form.

PERCY L. ORR.

REFERENCES CITED

The following references are of record in the file of this patent:

UNITED STATES PATENTS

| Number | Name | Date |
| --- | --- | --- |
| 1,721,983 | Bailey | July 23, 1929 |
| 2,001,436 | Schutz | May 14, 1935 |
| 2,266,417 | Eisler | Dec. 16, 1941 |